US012629802B2

(12) United States Patent
Lee

(10) Patent No.: US 12,629,802 B2
(45) Date of Patent: May 19, 2026

(54) QUICK RELEASE SOCKETS FOR INSULATED TOOLS

(71) Applicant: E-MARK TOOLS INTERNATIONAL CO., LTD., Taichung City (CN)

(72) Inventor: Kang-Yu Lee, Taichung City (CN)

(73) Assignee: E-MARK TOOLS INTERNATIONAL CO., LTD., Taichung City (TW)

( * ) Notice: Subject to any disclaimer, the term of this patent is extended or adjusted under 35 U.S.C. 154(b) by 304 days.

(21) Appl. No.: 18/214,409

(22) Filed: Jun. 26, 2023

(65) Prior Publication Data

US 2024/0424648 A1 Dec. 26, 2024

(51) Int. Cl.
*B25B 23/00* (2006.01)

(52) U.S. Cl.
CPC ................................ *B25B 23/0035* (2013.01)

(58) Field of Classification Search
CPC ...... B25B 23/0035; B25G 1/043; B25G 1/085
See application file for complete search history.

(56) References Cited

U.S. PATENT DOCUMENTS

| | | | | |
|---|---|---|---|---|
| 4,850,758 | A * | 7/1989 | Morgan | B23B 31/005 408/226 |
| 5,996,452 | A * | 12/1999 | Chiang | B25B 15/001 279/157 |
| 7,677,140 | B2 * | 3/2010 | Hull | B25G 1/043 81/177.2 |
| 9,463,558 | B2 * | 10/2016 | Yang | B25B 23/0035 |
| 10,343,266 | B2 * | 7/2019 | Zimmermann | B25B 21/00 |
| 11,065,744 | B2 * | 7/2021 | Zimmermann | B23B 31/1071 |
| 11,072,055 | B2 * | 7/2021 | Huang | B25B 15/02 |
| 11,207,772 | B2 * | 12/2021 | Hu | B25G 1/125 |
| 11,235,448 | B1 * | 2/2022 | Carnabuci | B25B 21/02 |
| 2009/0107304 | A1 * | 4/2009 | Chiang | B25B 23/12 81/429 |
| 2009/0139378 | A1 * | 6/2009 | Chiang | B25B 23/12 81/438 |
| 2010/0326248 | A1 * | 12/2010 | Owoc | B25G 1/043 81/177.2 |
| 2011/0049816 | A1 * | 3/2011 | Hsu | B25B 23/0035 279/30 |

(Continued)

FOREIGN PATENT DOCUMENTS

| | | | | |
|---|---|---|---|---|
| CN | 217317774 U * | 8/2022 | | B25B 23/0035 |
| DE | 212020000653 U1 * | 2/2022 | | B25B 13/06 |

(Continued)

*Primary Examiner* — David B. Thomas

(57) ABSTRACT

A quick release socket for an insulated tool has a main body and a socket jacketed on the main body. A polygonal hole is formed at a front end of the main body, a connecting rod protrudes from a rear end, at least a through hole is provided around the main body, and a fastening ring groove is provided around the main body. The through hole is connected to the polygonal hole, so the through hole provides the positioning ball for accommodation. The fastening ring groove has a stopping member inside. The socket has an engaging groove, and the engaging groove is divided by a protruding rib into a first accepting space and a second accepting space. A circular slot is provided at a front end of the inner wall of the socket.

5 Claims, 8 Drawing Sheets

(56) References Cited

U.S. PATENT DOCUMENTS

| | | | | |
|---|---|---|---|---|
| 2011/0179916 | A1* | 7/2011 | Wang | B25G 3/18 81/177.85 |
| 2014/0318327 | A1* | 10/2014 | Yang | B25B 23/0035 81/437 |
| 2016/0279769 | A1* | 9/2016 | Arslan | B25B 23/12 |
| 2017/0274509 | A1* | 9/2017 | Tsai | B25B 23/0035 |
| 2018/0326565 | A1* | 11/2018 | Wang | B25B 23/0035 |
| 2019/0299391 | A1* | 10/2019 | Hu | B25B 23/0042 |
| 2021/0170555 | A1* | 6/2021 | Snook | B25B 23/0035 |
| 2021/0339362 | A1* | 11/2021 | Zimmermann | B25B 23/12 |
| 2023/0029732 | A1* | 2/2023 | Springer | B25B 13/06 |

FOREIGN PATENT DOCUMENTS

| | | | | |
|---|---|---|---|---|
| TW | M334244 U * | 6/2008 | | F16L 37/00 |
| WO | WO-2006118002 A1 * | 11/2006 | | B25B 21/007 |

* cited by examiner

QUICK RELEASE SOCKETS FOR INSULATED TOOLS

BACKGROUND of INVENTION

Field of Invention

The present invention relates to a quick release socket.

Description of Related Art

Usually, the conventional connecting rod for tool bit shown in FIG. 7 and FIG. 8, is mainly composed of a base 40, a socket 50 and an elastic member 60, wherein the base 40 has a cylinder body 41 at one end, a housing chamber 411 is formed in the cylinder body 41, and an opening 412 passing through the housing chamber 411 is formed at the front end of the housing chamber 411 and configured for a tool head to be inserted into the housing chamber 411 through the opening 412. The side wall of the cylinder body 41 has a first through hole 42, a second the through hole 43 and a circular slot 44. The first through hole 42 is located behind the second through hole 43, and the first through hole 42 and the second through hole 43 are connected the housing chamber 41. The first a through hole 42 and the second the through hole 43 is capable of accommodating a first positioning ball 421 and a second the positioning ball 431 respectively, and the circular slot 44 is fastened with a hook 441. The socket 50 can be slidably arranged on the cylinder body 41, the inner wall of the rear end of the socket 50 has a protruding ring 51, and the inner wall of the socket 50 further has a stopping point 52. The buckle 441 pushes against the stopping point 52 to prevent the socket 50 from escaping away from the cylinder body 41. Furthermore, the socket 50 has an inclined section 53 from the back to the front, and the inclined section 53 is tapered from the back to the front. The elastic member 60 fits on the cylinder body 41 and presses against the protruding ring 51 and the buckle ring 441 to provide the socket 50 with a rearward elasticity.

However, the above known structure still has the following problems in practical application: the connecting rod of the tool head is pressed against between the protruding ring 51 and the hook 441 by the elastic member 60, and the elastic member 60 will gradually be fatigue after the repeatedly pressing operation, so that the elastic member 60 can no longer really support, and then will lose the ability to secure tool head.

Therefore, it is desirable to provide a quick release socket to mitigate and/or obviate the aforementioned problems.

SUMMARY OF THE INVENTION

An objective of the present invention is to provide a quick release socket which is easy to manufacture and providing better steadiness.

In order to achieve the above mentioned objective, A quick release socket for an insulated tool has a main body and a socket jacketed on the main body. A polygonal hole is formed at a front end of the main body, a connecting rod protrudes from a rear end, at least a through hole is provided around the main body, and a fastening ring groove is provided around the main body. The through hole is connected to the polygonal hole, so the through hole provides the positioning ball for accommodation. The fastening ring groove has a stopping member inside. The socket has an engaging groove, and the engaging groove is divided by a protruding rib into a first accepting space and a second accepting space. A circular slot is provided at a front end of the inner wall of the socket.

Other objects, advantages, and novel features of invention will become more apparent from the following detailed description when taken in conjunction with the accompanying drawings.

DESCRIPTION OF THE PREFERRED EMBODIMENT

Figure 1:
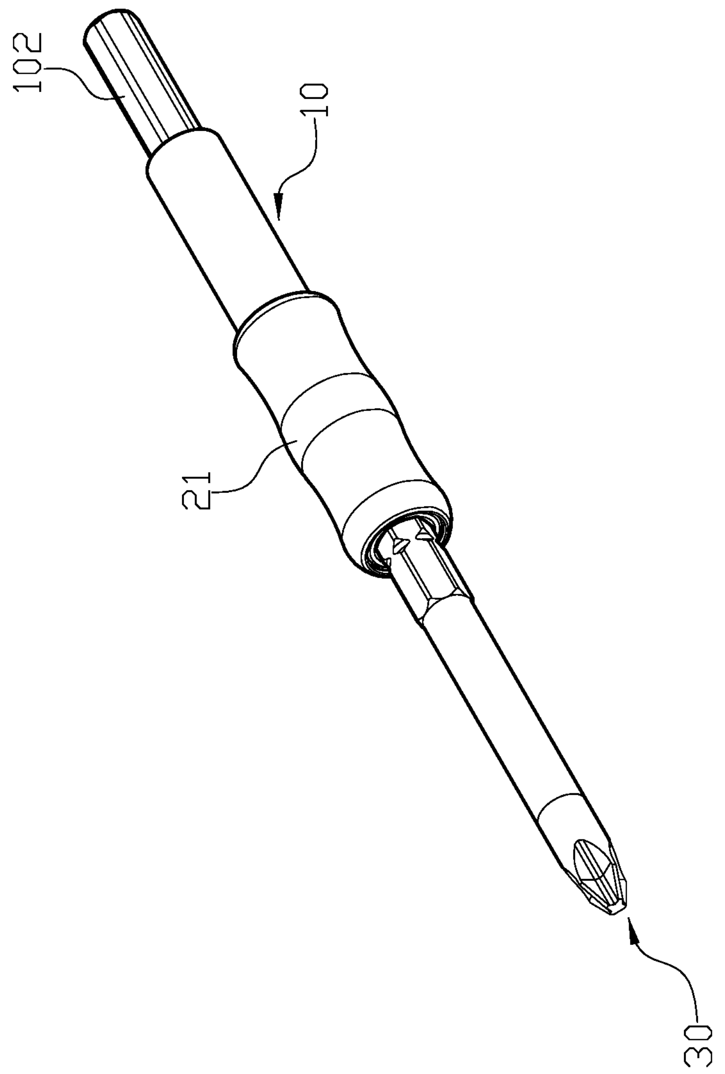
FIG. 1 is a three-dimensional assembly drawing of a preferred embodiment according to the present invention.
Figure 2:
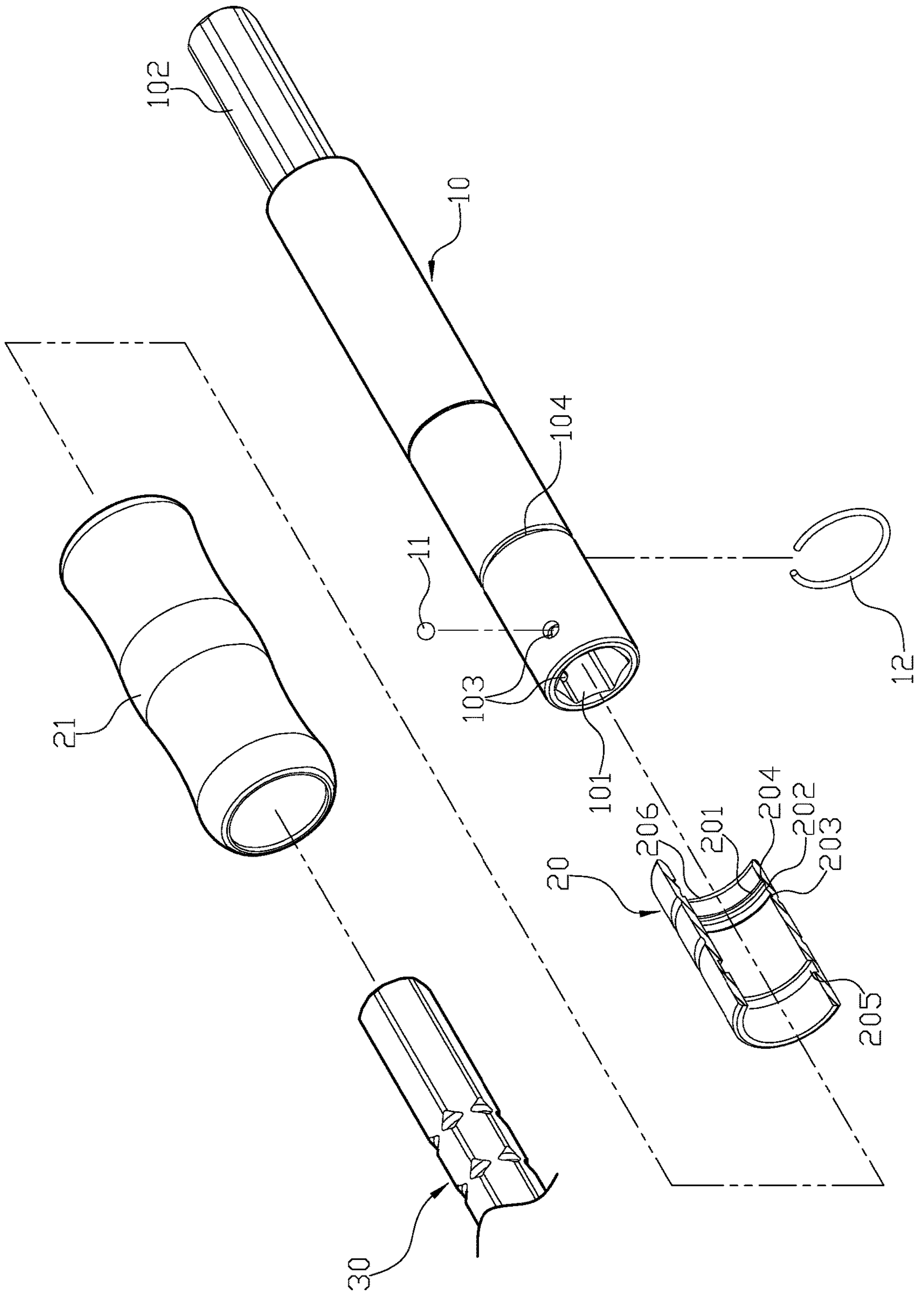
FIG. 2 is a three-dimensional exploded view of the preferred embodiment according to the present invention.

First, please refer to FIG. 1 and FIG. 2. A quick release socket for an insulated tool comprises a main body 10 and a socket 20 jacketed on the main body 10. The main body 10 has a polygonal hole 101 at a front end for accepting a tool bit 30 and a connecting rod 102 extending from a rear end for connecting to a driving rod. Furthermore, the driving rod can be part of a tool handle, an electrical tool or an air tool (not shown). An outer periphery of the main body 10 has at least one through hole 103 and a fastening ring groove 104, the through hole 103 is connected to the polygonal hole 101 and configured for accepting a positioning ball 11, and the fastening ring groove 104 further has a stopping member 12. The socket 20 has an engaging groove 201 with a protruding rib 202 at an inner wall, and the protruding rib 202 divides the engaging groove 201 into a first accepting space 203 and a second accepting space 204, and the protruding rib 202 has a two-way bevel. When the socket 20 slides back and forward on the main body 10, the two-way bevel of the protruding rib 202 allows the stopping member 12 to bypass the protruding rib 202 and engages in the first accepting space 203 or the second accepting space 204 to ensure the socket 220 is locked or released. Moreover, the socket 20 further has a circular slot 205 at a front end of the inner wall for controlling movement of the positioning ball 11, and the socket 20 is covered by an insulating gripping member 21.

In addition, the polygonal hole 101 the polygonal hole has a hexagonal shape.

Furthermore, the connecting rod 102 is a hexagonal rod.

Also, the stopping member 12 is a C-shaped hook.

Moreover, the socket 20 has an inner chamfer 206 at a rear end of the inner wall.

In actual use, the circular slot 205 is used to accommodate the positioning ball 11 after engagement, so that the tool head 30 can be smoothly inserted into the polygonal hole

Figure 3:
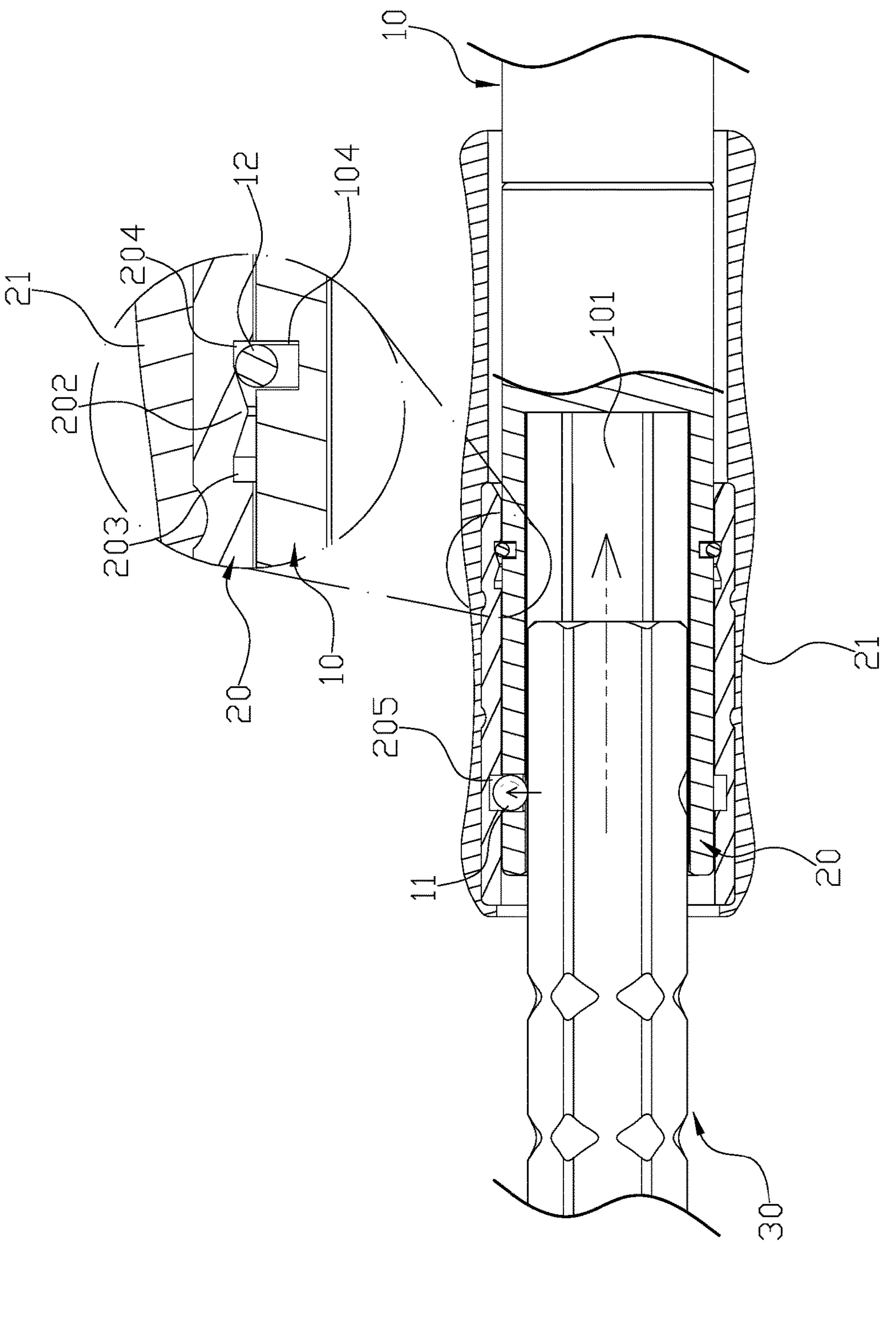
FIG. 3 is a schematic drawing showing a tool head being inserted in the preferred embodiment according to the present invention.
Figure 4:
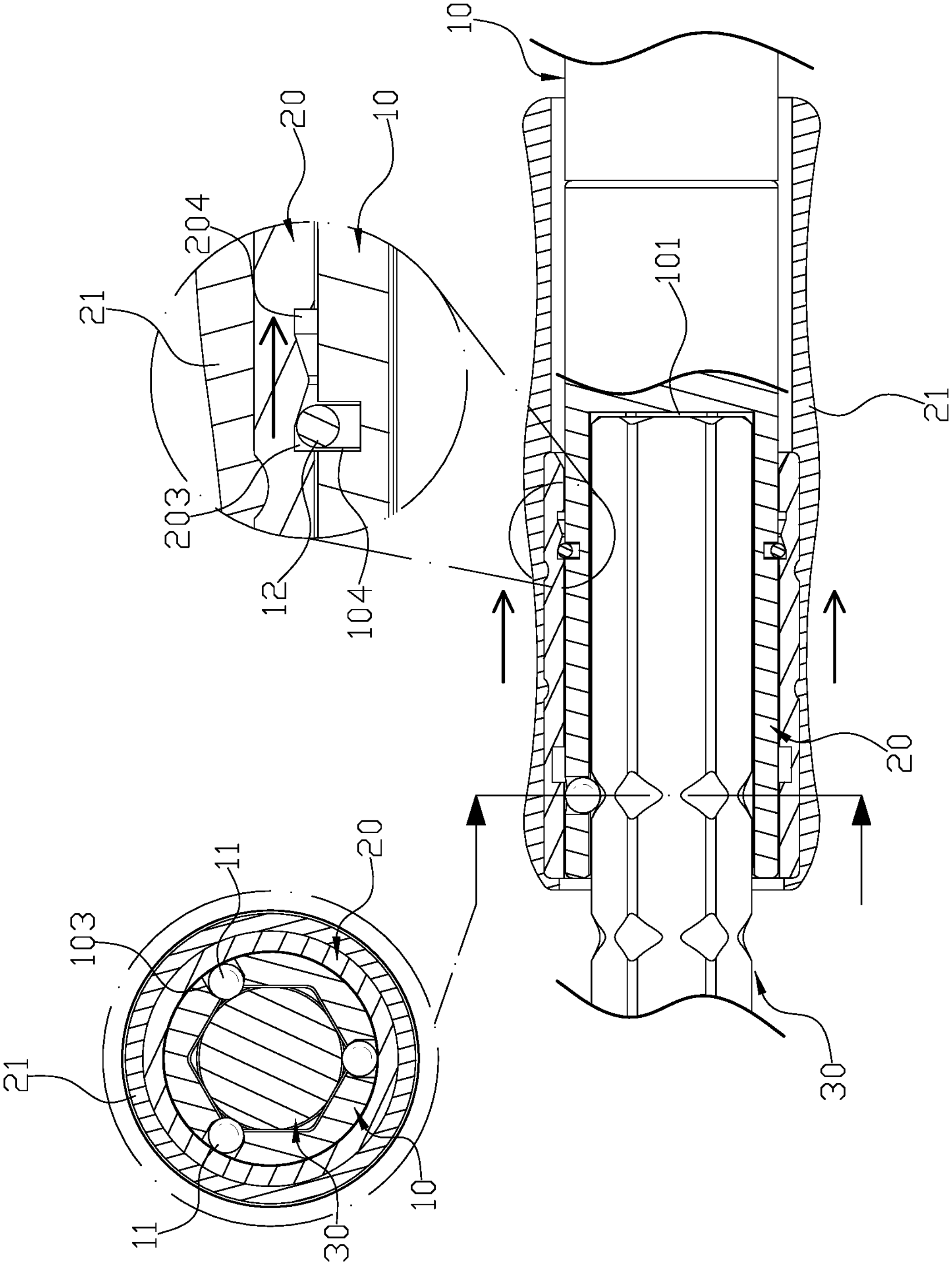
FIG. 4 is a schematic drawing showing the tool head being fully positioned in the preferred embodiment according to the present invention.
Figure 5:
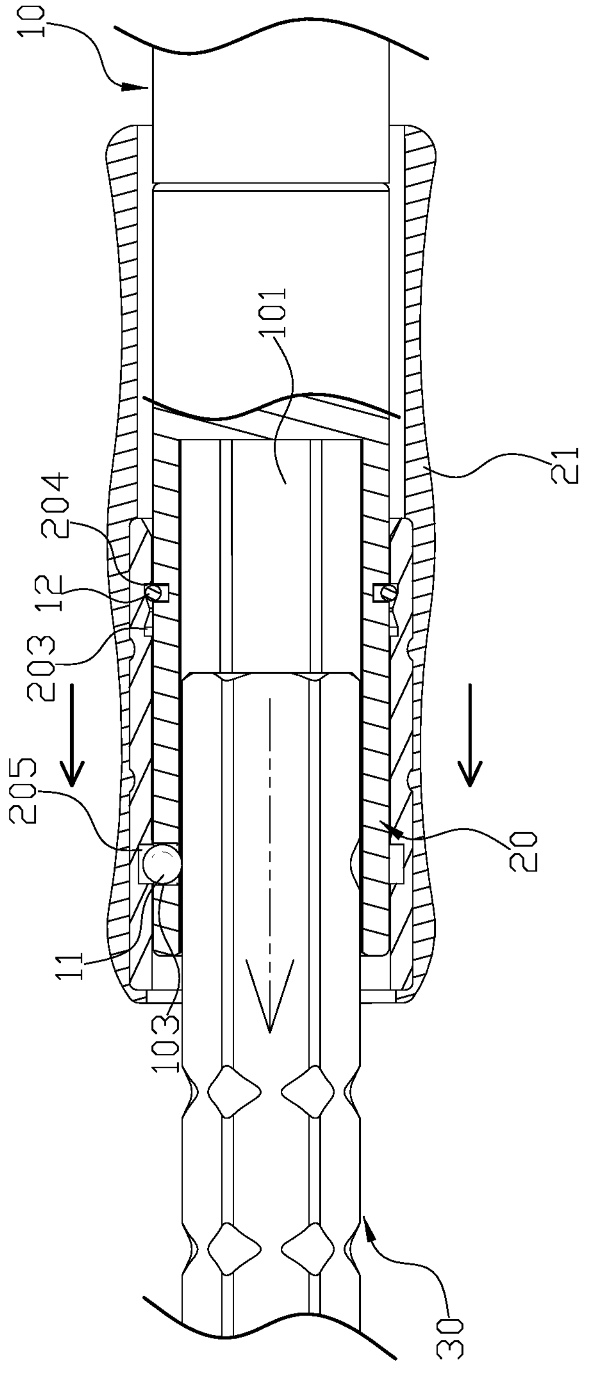
FIG. 5 is a schematic drawing showing the socket sliding forward according to the present invention.
Figure 6:
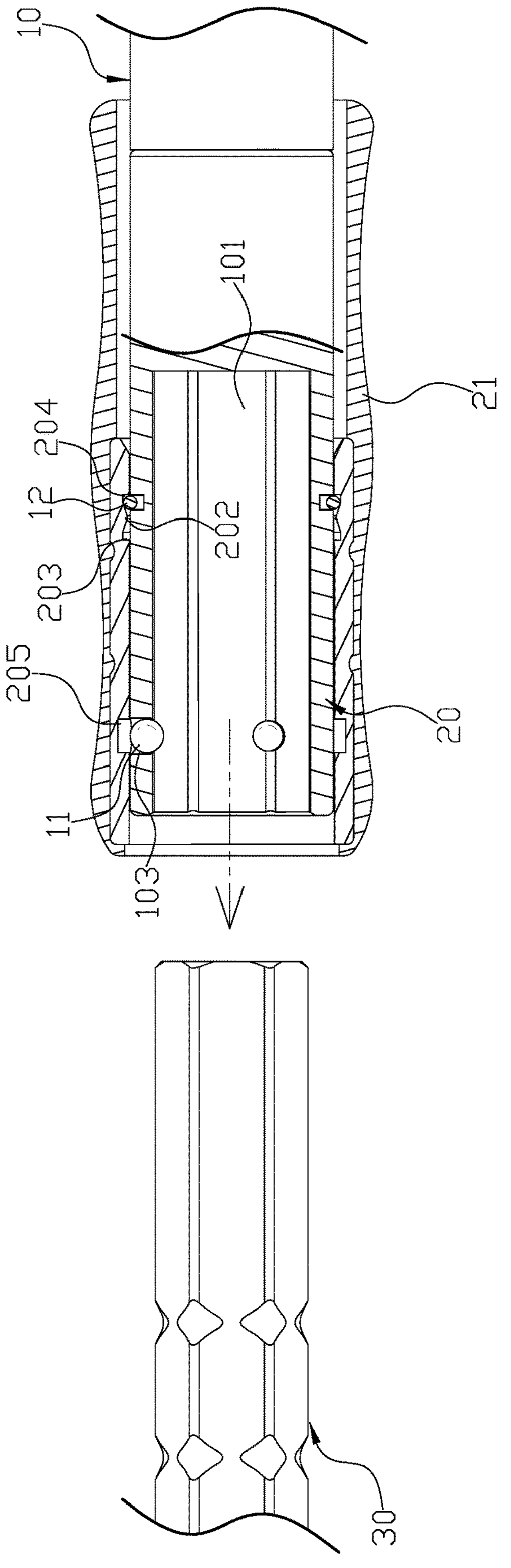
FIG. 6 is a schematic drawing showing the tool head being taken off from the preferred embodiment according to the present invention.
Figure 7:
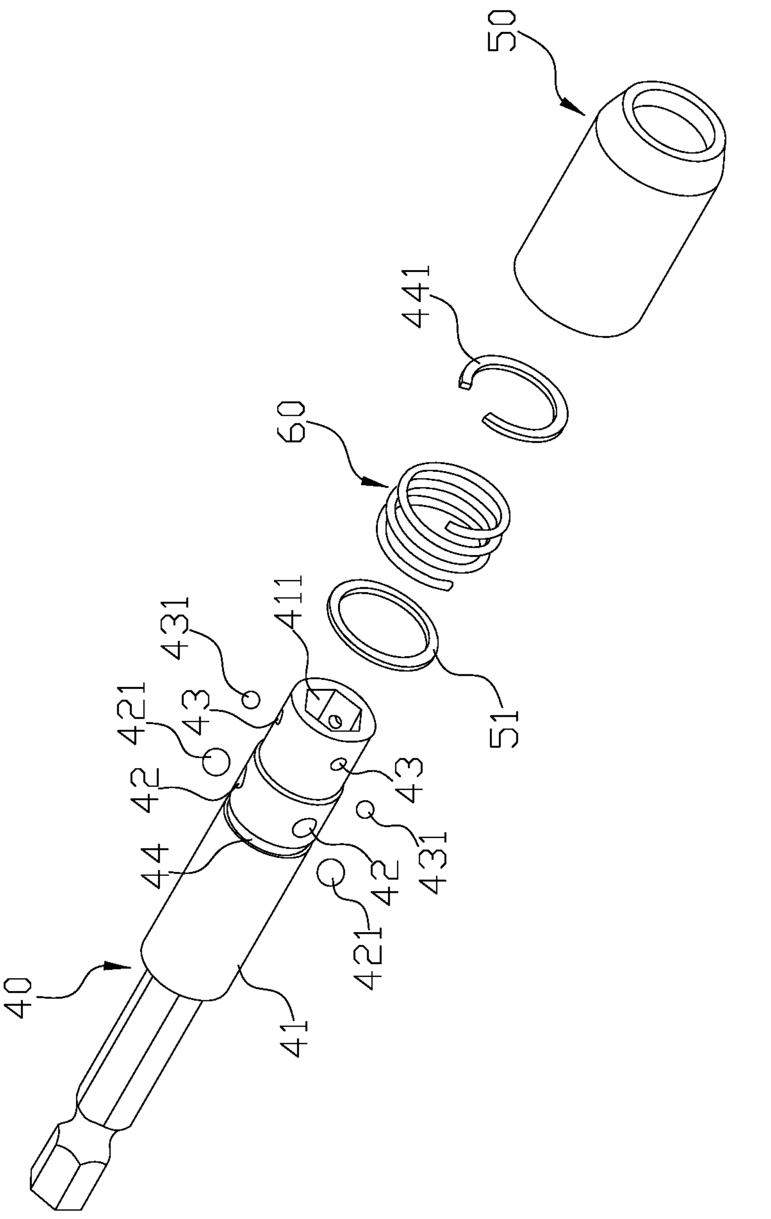
FIG.7 PRIOR ART
FIG. 7 is a three-dimensional exploded view of the conventional structure.
Figure 8:
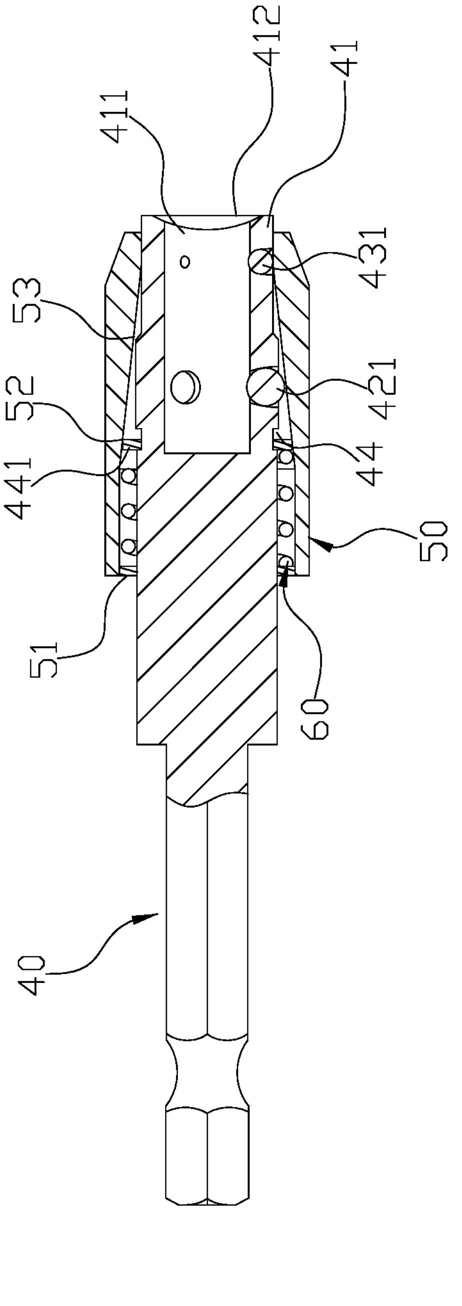
FIG.8 PRIOR ART
FIG. 8 is a cross-sectional view of a combination of conventional structures.

101 of the main body 10, as shown in FIG. 3, then the inserted tool head 30 drives the socket 20 to move backward through the gripping member 21, so the stopping member 12 is engaged with the first accepting space 20 to ensure the socket 20 is positioned in the backward state; and at the same time the positioning ball 11 is pushed inwardly by the socket 20, so that the positioning ball 11 protrudes from the polygonal hole 101 to provide sufficient tightening on the tool head 30, as shown in FIG. 4. On the contrary, when the tool head 30 needs to be removed or replaced, the gripping member 21 drives the socket 20 forward, and the stopping member 12 is changed to engage with the second accepting space 204, to ensure the socket 20 is positioned in the forward state, so the positioning ball 11 return to the circular slot 205 again, as shown in FIG. 5, and the tool head 30 can be smoothly removed from the main body 10, as shown in FIG. 6.

The above-mentioned quick release socket structure for the insulating tool has the following advantages: with the collaboration of the protruding rib 202, the first accepting space 203, and the second accepting space 204, the socket 20 to be able to slide forward and backward without additional spring is installed, and the socket 20 can be positioned in the tight or loose state. Therefore, there is no issue cause the quick release structure cannot continue to be used due to the fatigue of the spring elasticity, and the service life can be longer.

Although the present invention has been explained in relation to its preferred embodiment, it is to be understood that many other possible modifications and variations can be made without departing from the spirit and scope of invention as hereinafter claimed.

What is claimed is:

1. A quick release socket for an insulated tool comprising:

a main body, and a socket jacketed on the main body;

wherein the main body has a polygonal hole at a front end for accepting a tool bit and a connecting rod extending from a rear end for connecting to a driving rod;

an outer periphery of the main body has at least one through hole and a fastening ring groove, the through hole connected to the polygonal hole and configured for accepting a positioning ball, and the fastening ring groove further has a stopping member;

the socket has an engaging groove with a protruding rib at an inner wall, and the protruding rib divides the engaging groove into a first accepting space and a second accepting space, the protruding rib having a two-way bevel;

wherein when the socket slides back and forward on the main body, the two-way bevel of the protruding rib allows the stopping member to bypass the protruding rib and engages in the first accepting space in which the socket is locked or the second accepting space in which the socket is released;

the socket has a circular slot at a front end of the inner wall for controlling movement of the positioning ball;

the first accepting space is closer to the circular slot than the second accepting space; and the socket is covered by an insulating gripping member.

2. The quick release socket for an insulated tool as claimed in claim 1, wherein the polygonal hole has a hexagonal shape.

3. The quick release socket for an insulated tool as claimed in claim 1, wherein the connecting rod is a hexagonal rod.

4. The quick release socket for an insulated tool as claimed in claim 1, wherein the stopping member is a C-shaped hook.

5. The quick release socket for an insulated tool as claimed in claim 1, wherein the socket has an inner chamfer at a rear end of the inner wall.

* * * * *